United States Patent
Takatani et al.

(10) Patent No.: US 9,892,859 B2
(45) Date of Patent: Feb. 13, 2018

(54) METHOD OF PRODUCING CONDUCTIVE POLYMER PARTICLE DISPERSION, AND METHOD OF PRODUCING ELECTROLYTIC CAPACITOR USING CONDUCTIVE POLYMER PARTICLE DISPERSION

(71) Applicant: Panasonic Intellectual Property Management Co., Ltd., Osaka (JP)

(72) Inventors: Kazuhiro Takatani, Yamaguchi (JP); Tatsuji Aoyama, Yamaguchi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/860,222

(22) Filed: Sep. 21, 2015

(65) Prior Publication Data
US 2016/0012972 A1    Jan. 14, 2016

Related U.S. Application Data

(63) Continuation of application No. PCT/JP2013/002152, filed on Mar. 29, 2013.

(51) Int. Cl.
*C08G 61/00* (2006.01)
*C08L 65/00* (2006.01)
(Continued)

(52) U.S. Cl.
CPC ......... *H01G 9/0036* (2013.01); *C08G 61/126* (2013.01); *C08L 65/00* (2013.01);
(Continued)

(58) Field of Classification Search
CPC ........ H01G 9/0036; H01G 9/02; H01G 9/028; H01G 9/055; H01G 9/07; H01G 9/151;
(Continued)

(56) References Cited

U.S. PATENT DOCUMENTS

| 5,300,575 A | 4/1994 | Jonas et al. |
| 2003/0211331 A1 | 11/2003 | Louwet et al. |

(Continued)

FOREIGN PATENT DOCUMENTS

| CN | 1599766 | 3/2005 |
| JP | 2636968 B | 8/1997 |

(Continued)

OTHER PUBLICATIONS

English Translation of Chinese Search Report dated Jan. 17, 2017 for the related Chinese Patent Application No. 201380075251.X.
(Continued)

*Primary Examiner* — Harold Pyon
*Assistant Examiner* — Danny N Kang
(74) *Attorney, Agent, or Firm* — McDermott Will & Emery LLP

(57) ABSTRACT

A dispersion liquid including one of thiophene and derivatives thereof, a polyanion, and a solvent is prepared. The dispersion liquid is mixed with a first oxidizing agent producing iron ions so as to oxidatively polymerize the one of thiophene and derivatives thereof. At the completion of the polymerization, the conductive polymer microparticle dispersion contains trivalent iron ions with a concentration of 3 to 30 parts by weight, inclusive, with respect to 100 parts by weight of the conductive polymer microparticle.

20 Claims, 2 Drawing Sheets

(51) Int. Cl.
*H01G 9/00* (2006.01)
*H01G 9/028* (2006.01)
*C08G 61/12* (2006.01)
*H01G 9/15* (2006.01)
*H01G 9/02* (2006.01)
*H01G 9/055* (2006.01)
*H01G 9/07* (2006.01)
*H01G 9/08* (2006.01)
*H01G 9/045* (2006.01)

(52) U.S. Cl.
CPC ............... *H01G 9/02* (2013.01); *H01G 9/028* (2013.01); *H01G 9/055* (2013.01); *H01G 9/07* (2013.01); *H01G 9/08* (2013.01); *H01G 9/151* (2013.01); *C08G 2261/1424* (2013.01); *C08G 2261/3223* (2013.01); *C08G 2261/794* (2013.01); *H01G 9/045* (2013.01)

(58) Field of Classification Search
CPC .................. H01G 9/045; C08G 61/125; C08G 2261/1424; C08G 2261/3223; C08G 2261/794; C08L 65/00
USPC ........................................................ 252/500
See application file for complete search history.

(56) References Cited

U.S. PATENT DOCUMENTS

2010/0033905 A1    2/2010  Kobayakawa et al.
2014/0022706 A1*   1/2014  Sugawara .................. C08J 3/05
                                                    361/527

FOREIGN PATENT DOCUMENTS

| JP | 2008-171761   |   | 7/2008  |
|----|---------------|---|---------|
| JP | 2008-222850   |   | 9/2008  |
| JP | 2009-221417   |   | 10/2009 |
| JP | 2011-116925   |   | 6/2011  |
| JP | 2011116925  A | * | 6/2011  |
| JP | 2012-104851   |   | 5/2012  |
| JP | 2012-222146   |   | 11/2012 |

OTHER PUBLICATIONS

English Translation of Chinese Search Report dated May 17, 2016 for the related Chinese Patent Application No. 201380075251.X.
International Search Report of PCT application No. PCT/JP2013/002152 dated Jun. 4, 2013.

* cited by examiner

METHOD OF PRODUCING CONDUCTIVE POLYMER PARTICLE DISPERSION, AND METHOD OF PRODUCING ELECTROLYTIC CAPACITOR USING CONDUCTIVE POLYMER PARTICLE DISPERSION

BACKGROUND

1. Technical Field

The present disclosure relates to a method of manufacturing a conductive polymer microparticle dispersion applicable to an antistatic agent, an electrolyte for an electrolytic capacitor, a display element, and others. The present disclosure also relates to a method of manufacturing an electrolytic capacitor using the conductive polymer microparticle dispersion.

2. Description of Related Art

Dopant-containing polymers having a π-conjugated structure are known to have high conductivity. Dopants are substances to develop conductivity. These polymers are used in antistatic agents, display elements, etc. because of their chemical and physical stability in addition to their high conductivity. They have also been suggested to be used in solid electrolytes for electrolytic capacitors.

One known process of manufacturing such a conductive polymer having a π-conjugated structure is to oxidatively polymerize a monomer with an oxidizing agent in the presence of a dopant. For example, the use of 3,4-ethylenedioxythiophene as the monomer, and polystyrene sulfonic acid as the dopant results in highly conductive poly3,4-ethylenedioxythiophene doped with the polystyrene sulfonic acid. The poly3,4-ethylenedioxythiophene prepared by this method is in the form of microparticles dispersed in water. Thus, the above-described method can prepare a conductive polymer microparticle dispersion (see, for example, Japanese Unexamined Patent Publication No. 2008-222850).

SUMMARY

The method of manufacturing a conductive polymer microparticle dispersion according to the present disclosure includes the following steps:

(A) preparing a dispersion liquid one of thiophene and derivatives thereof, polyanion and a solvent;

(B) preparing a conductive polymer microparticle dispersion by mixing the dispersion liquid with a first oxidizing agent producing iron ions in the solvent so as to oxidatively polymerize the one of thiophene and derivatives thereof. At the completion of the oxidative polymerization, the conductive polymer microparticle dispersion contains trivalent iron ions with a concentration of 3 to 30 parts by weight, inclusive, with respect to 100 parts by weight of the conductive polymer microparticles.

The above-described method can prepare a conductive polymer microparticle dispersion having high productivity in mass production. In this dispersion, the polyanion-doped conductive polythiophene suitable for use in a solid electrolyte for an electrolytic capacitor is dispersed in water in the form of microparticles. By using the polythiophene for a solid electrolyte, a long-life electrolytic capacitor with a low equivalent series resistance (ESR) can be manufactured.

DETAILED DESCRIPTION OF PREFERRED EMBODIMENTS

It is possible to obtain a conductive polymer by removing the solvent component from the conductive polymer microparticle dispersion prepared by the above-described conventional method. However, when this conductive polymer is used in a solid electrolyte for an electrolytic capacitor, the electrolytic capacitor may have a high ESR depending on the method and conditions of forming a conductive polymer film. Therefore, when a conductive polymer microparticle dispersion having a π-conjugated structure is used as a solid electrolyte for electrolytic capacitors, it is crucial to make the dispersion suitable for use in the solid electrolyte for electrolytic capacitors.

Figure 1:
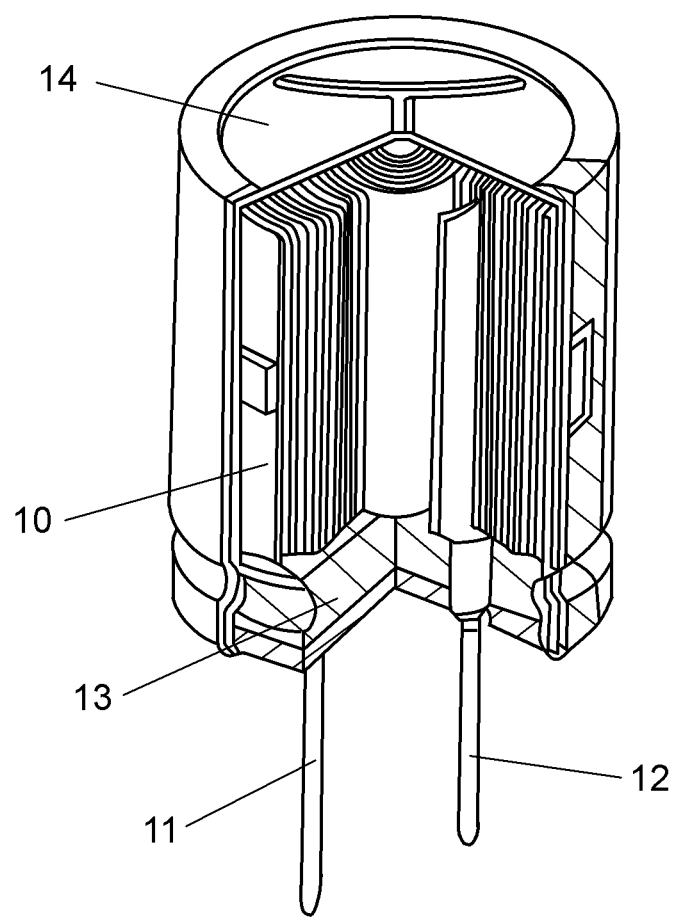
FIG. 1 is a partially cutaway schematic perspective view of an electrolytic capacitor formed by using a conductive polymer microparticle dispersion prepared by the method according to an exemplary embodiment of the present disclosure.
Figure 2:
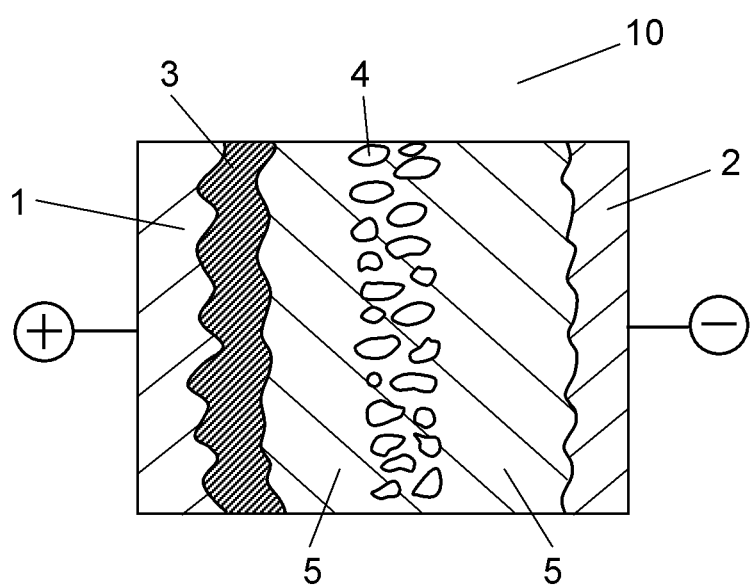
FIG. 2 is a partial sectional view of a capacitor element contained in the electrolytic capacitor shown in FIG. 1.

An exemplary embodiment of the present disclosure will now be described with reference to FIGS. 1 and 2. FIG. 1 is a partially cutaway perspective view of an electrolytic capacitor manufactured by using a conductive polymer microparticle dispersion prepared by the method according to the exemplary embodiment of the present disclosure. FIG. 2 is a partial sectional view of a capacitor element contained in the electrolytic capacitor shown in FIG. 1.

As shown in FIG. 1, the electrolytic capacitor includes capacitor element 10, metal case 14, and sealing member 13. Case 14 houses capacitor element 10, and sealing member 13 seals the opening of case 14. Thus, case 14 and sealing member 13 together form an outer body which seals capacitor element 10.

As shown in FIG. 2, capacitor element 10 includes positive electrode 1, negative electrode 2, separator 4, and solid electrolyte layer 5. Separator 4 and solid electrolyte layer 5 are interposed between positive electrode 1 and negative electrode 2. Positive electrode 1 is made of an aluminum foil whose surface is etched to roughen it first and then subjected to a chemical conversion treatment to form dielectric oxide film layer 3. Negative electrode 2 is also made of an aluminum foil whose surface is etched to roughen it. Positive electrode 1 and negative electrode 2 are connected to lead terminals 11 and 12, respectively, as shown in FIG. 1. Lead terminals 11 and 12 are led out through sealing member 13.

In capacitor element 10, positive electrode 1 and negative electrode 2 are wound with separator 4 interposed therebetween. Capacitor element 10 is impregnated with an aftermentioned conductive polymer microparticle dispersion, and then dried to remove the solvent component so as to form conductive polymer solid electrolyte layer 5 between positive electrode 1 and negative electrode 2.

The following is a brief description of a method of manufacturing a conductive polymer microparticle dispersion used for solid electrolyte layer 5. First, a dispersion liquid is prepared by dispersing, in a water-based solvent, at least one monomer selected from thiophenes and their derivatives, and at least one polyanion as a dopant selected from polyanions. Next, the dispersion liquid is mixed with an oxidizing agent that contains a first oxidizing agent producing iron ions in the solvent so as to oxidatively polymerize the monomer. The result is a conductive polythiophene dispersion doped with the polyanion.

The thiophenes and their derivatives applicable as the monomer have a n-conjugated structure. Examples of this monomer include the following: thiophene, 3-methylthiophene, 3-ethylthiophene, 3-propylthiophene, 3-butylthiophene, 3-hexylthiophene, 3-heptylthiophene, 3-octylthiophene, 3-nonylthiophene, 3-decylthiophene, 3-methoxythiophene, 3-ethoxythiophene, 3-butoxythiophene, 3-methyl-4-methoxythiophene, 3,4-ethylenedioxythiophene, benzothiophene, and benzodithiophene. Among them, 3,4-ethylenedioxythiophene is especially preferable because it can be polymerized at a moderate rate and can also provide the resultant polymer with high heat resistance.

The polyanions that can be used as the dopant include the following: polyvinyl sulfonic acid, polystyrene sulfonic acid, polyacrylic sulfonic acid, polyacrylamide tertiary butylsulfonic acid, polyacrylic acid, polymethacrylacid, polymaleic acid, copolymers containing these structural units, and the ammonium, lithium, and sodium salts of these polyanions. Among them, polystyrene sulfonic acid is especially preferable because of its excellent dispersibility and heat resistance. These polyanions may be used alone or in combination of two or more.

The weight-average molecular weight of the polyanions is preferably 10000 to 400000, inclusive, more preferably 30000 to 200000, inclusive, and most preferably 50000 to 100000, inclusive. The number-average molecular weight of the polyanions is preferably 1000 to 300000, inclusive, more preferably 10000 to 150000, inclusive, and most preferably 20000 to 100000, inclusive.

Examples of the first oxidizing agent which produces iron ions in the solvent include the following: iron salts of inorganic acids such as iron chloride (III), iron sulfate (III), and iron nitrate (III); and iron salts of organic acids such as iron methoxybenzenesulfonate and iron toluenesulfonate. Among them, iron sulfate (III) is particularly preferable because it can allow the monomer to be polymerized at a moderate rate and can also provide the resultant polymer with high heat resistance. Iron sulfate (III) is hereinafter referred to as ferric sulfate.

The first oxidizing agent is used together with a second oxidizing agent not producing iron ions in a solvent. Examples of the second oxidizing agent include the following: hydrogen peroxide, persulfate, permanganate, benzoyl peroxide, and ozone. Among them, ammonium persulfate is especially preferably because of the following features: it can be kept for a long period, be easy to care for, allow the monomer to be polymerized at a moderate rate, and also provide the resultant polymer with high heat resistance.

It is preferable that the water to be used as the solvent be ion exchange water or distilled water because of their low impurity content. The solvent is water-based. This means that the solvent consists of about 95% or more of water and only trace amounts of impurities or additives.

The following is a description of how to prepare the dispersion liquid. The monomer and the polyanion are added at the same time to the water in a container under shear stress applied by a dispersing machine. Alternatively, the monomer and the polyanion may be added sequentially to the water in the container under shear stress applied by the dispersing machine. Further alternatively, the monomer and the polyanion may be added to the water in the container first, and then be exposed to shear stress applied by the dispersing machine. Examples of the dispersing machine include a homomixer and a high-pressure homogenizer.

Adding the monomer and the polyanion at the same time to the water takes less time for dispersion than adding them sequentially. Instead of adding the monomer first and then the polyanion, the polyanion can be added first and then the monomer. Furthermore, some of the water may be placed in the container before adding the monomer and the polyanion, and then the remaining water may be added in a plurality of batches during dispersion.

The objective of these operations is to disperse the monomer having a hydrophobic n-conjugated structure into water by making it in the form of microparticles, and these operations are not the only possible approaches. In the case of using a solid or viscous polyanion, it can be dissolved or diluted in water and be used as an aqueous solution.

The preferable water content is 9 parts by weight or more with respect to 1 part by weight of the monomer. When the water content is less than this amount, the dispersion liquid may become too viscous during the polymerization, possibly making it impossible to obtain a uniform conductive polymer microparticle dispersion.

The preferable polyanion content is 1 to 5 parts by weight, inclusive with respect to 1 part by weight of the monomer. When the polyanion content is less than 1 part by weight, the resultant conductive polymer has a low conductivity. When, on the other hand, the polyanion content is more than 5 parts by weight, the conductivity of the resultant conductive polymer hardly increases. As a result, considering the material cost, it is preferable to use 5 parts by weight or less of the polyanion.

The monomer is oxidatively polymerized in the following manner. An oxidizing agent is added to the above-prepared dispersion liquid under shear stress applied by a dispersing machine. In the case of using a solid or viscous oxidizing agent, it can be dissolved or diluted in water and be used as an aqueous solution. Thus, the monomer in a dispersed state is oxidatively polymerized to form a polymer (hereinafter, polythiophene) in the form of microparticles. The monomer is kept under shear stress applied by the dispersing machine even after the oxidizing agent is added until the polymerization is over. As a result, a polythiophene dispersion doped with the polyanion is completed. The dispersion liquid and the oxidizing agent may be put into separate devices before the oxidatively polymerizing of the monomer. Thus, how to oxidatively polymerize the monomer is not particularly limited as long as the dispersion liquid and the oxidizing agent are mixed with each other.

During dispersion and polymerization, the dispersion liquid and the dispersion preferably be at a temperature in the range of 5 to 10° C., inclusive, so as to react at an appropriate rate.

At the completion of the polymerization, the dispersion contains the trivalent iron ions (ferric ions) with a concentration of 3 to 30 parts by weight, inclusive, with respect to 100 parts by weight of the polythiophene. This range is achieved by adjusting the type and amount of the materials as well as the dispersing and polymerizing conditions. Controlling the concentration of the trivalent iron ions contained in the dispersion at the completion of the polymerization as described above results in the conductive polymer microparticle dispersion in which the conductive polythiophene is dispersed. The polythiophene is doped with polyanion and is suitable as a solid electrolyte for an electrolytic capacitor. Thus, by using the polythiophene as a solid electrolyte, a long-life electrolytic capacitor with a low equivalent series resistance (ESR) can be manufactured.

Effects of the exemplary embodiment will now be described with reference to specific examples.

Examples 1-5

First, as a monomer having a n-conjugated structure, 3,4-ethylenedioxythiophene is added to distilled water in a container. Next, as a polyanion, a 29.5% aqueous solution of polystyrene sulfonic acid is added thereto. Then the resultant mixture is exposed to shear stress applied by a homomixer for ten minutes to prepare a dispersion liquid of 3,4-ethylenedioxythiophene.

While the dispersion liquid is under shear stress applied by the homomixer, a 2.25% aqueous solution of ferric sulfate is added as the first oxidizing agent, and immediately after this, a 28.8% aqueous solution of ammonium persulfate is added as the second oxidizing agent. After the addition of these oxidizing agents, shear stress is applied for 24 consecutive hours by the homomixer and then the polymerization is terminated to prepare the conductive polymer microparticle dispersion.

Example 1 uses the following materials in the following contents: 14.2 parts by weight of 3,4-ethylenedioxythiophene, 30.5 parts by weight of polystyrene sulfonic acid, 8.5 parts by weight of ferric sulfate, 29.8 parts by weight of ammonium persulfate, and 5240 parts by weight of distilled water.

In Examples 2, 3, 4, and 5, conductive polymer microparticle dispersions are prepared in the same manner as in Example 1 except for the following: in Example 2, the ferric sulfate content is 8.3 parts by weight and the distilled water content is 4176 parts by weight; in Example 3, the ferric sulfate content is 3.7 parts by weight and the distilled water content is 348 parts by weight; in Example 4, the ferric sulfate content is 2.8 parts by weight and the distilled water content is 136 parts by weight; and in Example 5, the ferric sulfate content is 2.8 parts by weight and the distilled water content is 116 parts by weight.

At the completion of the polymerization, poly3,4-ethylenedioxythiophene doped with the polystyrene sulfonic acid is dispersed in the solvent. The concentration of the trivalent iron ions contained in the dispersion is measured by capillary electrophoresis. The content (concentration) of the trivalent iron ions per 100 parts by weight of the poly3,4-ethylenedioxythiophene is as follows: 3.0 parts by weight in Example 1; 3.1 parts by weight in Example 2; 3.0 parts by weight in Example 3; 3.1 parts by weight in Example 4; and 3.0 parts by weight in Example 5.

The content of the trivalent iron ions with respect to 100 parts by weight of the dispersion is as follows: 0.007 parts by weight in Example 1; 0.01 parts by weight in Example 2; 0.111 parts by weight in Example 3; 0.190 parts by weight in Example 4; and 0.233 parts by weight in Example 5. Thus, in Examples 1-5, the content of the trivalent iron ions with respect to 100 parts by weight of the poly3,4-ethylenedioxythiophene is approximately 3 parts by weight, and the content of the trivalent iron ions with respect to 100 parts by weight of the dispersion is different from each other.

Examples 6-10

In Examples 6-10, conductive polymer microparticle dispersions are prepared in the same manner as in Example 1 except for changing the contents of the materials.

In Example 6, the ferric sulfate content is 25.1 parts by weight and the distilled water content is 17660 parts by weight. In Example 7, the ferric sulfate content is 25.0 parts by weight and the distilled water content is 14111 parts by weight. In Example 8, the ferric sulfate content is 13.0 parts by weight and the distilled water content is 1337 parts by weight. In Example 9, the ferric sulfate content is 10.1 parts by weight and the distilled water content is 627 parts by weight. In Example 10, the ferric sulfate content is 11.0 parts by weight and the distilled water content is 562 parts by weight.

The content (concentration) of the trivalent iron ions with respect to 100 parts by weight of the poly3,4-ethylenedioxythiophene doped with the polystyrene sulfonic acid at the completion of the polymerization is as follows: 9.4 parts by weight in Example 6; 10.2 parts by weight in Example 7; 10.1 parts by weight in Example 8; 10.0 parts by weight in Example 9; and 10.5 parts by weight in Example 10.

The content of the trivalent iron ions with respect to 100 parts by weight of the dispersion is as follows: 0.008 parts by weight in Example 6; 0.010 parts by weight in Example 7; 0.105 parts by weight in Example 8; 0.200 parts by weight in Example 9; and 0.224 parts by weight in Example 10. Thus, in Examples 6-10, the content of the trivalent iron ions with respect to 100 parts by weight of the poly3,4-ethylenedioxythiophene is approximately 10 parts by weight, and the content of the trivalent iron ions with respect to 100 parts by weight of the dispersion is different from each other.

Examples 11-15

In Examples 11-15, conductive polymer microparticle dispersions are prepared in the same manner as in Example 1 except for changing the contents of the materials.

In Example 11, the ferric sulfate content is 76.2 parts by weight and the distilled water content is 53144 parts by weight. In Example 12, the ferric sulfate content is 75.8 parts by weight and the distilled water content is 42495 parts by weight. In Example 13, the ferric sulfate content is 38.0 parts by weight and the distilled water content is 4160 parts by weight. In Example 14, the ferric sulfate content is 29.4 parts by weight and the distilled water content is 2030 parts by weight. In Example 15, the ferric sulfate content is 29.7 parts by weight and the distilled water content is 1837 parts by weight.

The content (concentration) of the trivalent iron ions with respect to 100 parts by weight of the poly3,4-ethylenedioxythiophene doped with the polystyrene sulfonic acid at the completion of the polymerization is as follows: 30.0 parts by weight in Example 11; 29.8 parts by weight in Example 12; 29.6 parts by weight in Example 13; 29.8 parts by weight in Example 14, and 30.0 parts by weight in Example 15.

The content of the trivalent iron ions with respect to 100 parts by weight of the dispersion is as follows: 0.007 parts by weight in Example 11; 0.010 parts by weight in Example 12; 0.110 parts by weight in Example 13; 0.198 parts by weight in Example 14, and 0.225 parts by weight in Example 15. Thus, in Examples 11-15, the content of the trivalent iron ions with respect to 100 parts by weight of the poly3,4-ethylenedioxythiophene is approximately 30 parts by weight, and the content of the trivalent iron ions with respect to 100 parts by weight of the dispersion is different from each other.

Examples 16-18

In Examples 16-18, conductive polymer microparticle dispersions are prepared with the same contents as in Example 8 as follows: 14.2 parts by weight of the 3,4-ethylenedioxythiophene; 30.5 parts by weight of the polystyrene sulfonic acid; 13.0 parts by weight of the ferric sulfate; 29.8 parts by weight of the ammonium persulfate; and 1337 parts by weight of the distilled water.

In Example 16, the ferric sulfate and the ammonium persulfate are added successively in this order each in four approximately equal batches separately. More specifically, one quarter of the amount of the ferric sulfate used in Example 8 is added, and immediately after this, one quarter of the amount of the ammonium persulfate used in Example 8 is added. After five minutes, the same operation is performed. This operation is repeated two more times.

In Example 17, the ferric sulfate and the ammonium persulfate are added each in two equal batches separately. More specifically, half of the amount of the ferric sulfate used in Example 8 is added, and immediately after this, half of the amount of the ammonium persulfate is added. After 15 minutes, the same operation is performed.

In Example 18, a conductive polymer microparticle dispersion is prepared in the same manner as in Example 1 except that the interval between the two additions performed in Example 17 is made 30 minutes.

The content (concentration) of the trivalent iron ions with respect to 100 parts by weight of the poly3,4-ethylenedioxythiophene doped with the polystyrene sulfonic acid at the completion of the polymerization is as follows: 10.3 parts by weight in Example 16; 10.3 parts by weight in Example 17; and 10.5 parts by weight in Example 18.

The content of the trivalent iron ions with respect to 100 parts by weight of the dispersion is as follows: 0.113 parts by weight in Example 16; 0.101 parts by weight in Example 17; and 0.110 parts by weight in Example 18.

Example 19

In Example 19, a conductive polymer microparticle dispersions is prepared with the almost same contents as in Example 8 as follows: 14.2 parts by weight of the 3,4-ethylenedioxythiophene; 30.5 parts by weight of the polystyrene sulfonic acid; 13.2 parts by weight of the ferric sulfate; 29.8 parts by weight of the ammonium persulfate; and 1337 parts by weight of the distilled water. In Example 19, the ferric sulfate is added immediately after the ammonium persulfate is added. In other words, the order of adding them is reversed. The conductive polymer microparticle dispersion of Example 19 is prepared in the same manner as in Example 1 except for these conditions.

In Example 19, the concentration of the trivalent iron ions contained in the poly3,4-ethylenedioxythiophene dispersion doped with the polystyrene sulfonic acid at the completion of the polymerization is 10.1 parts by weight with respect to 100 parts by weight of the poly3,4-ethylenedioxythiophene. The content of the trivalent iron ions with respect to 100 parts by weight of the dispersion is 0.1 parts by weight.

Example 20

A conductive polymer microparticle dispersion is prepared in the same manner as in Example 1 except for using, as the first oxidizing agent, 8.5 parts by weight of ferric chloride in place of the ferric sulfate. The concentration of the trivalent iron ions with respect to 100 parts by weight of the poly3,4-ethylenedioxythiophene doped with the polystyrene sulfonic acid at the completion of the polymerization is 3.1 parts by weight. The content of the trivalent iron ions with respect to 100 parts by weight of the dispersion is 0.008 parts by weight.

Example 21

A conductive polymer microparticle dispersion is prepared in the same manner as in Example 1 except for using, as the second oxidizing agent, 30 parts by weight of sodium persulfate in place of the ammonium persulfate. The concentration of the trivalent iron ions with respect to 100 parts by weight of the poly3,4-ethylenedioxythiophene doped with the polystyrene sulfonic acid at the completion of the polymerization is 3.0 parts by weight. The content of the trivalent iron ions with respect to 100 parts by weight of the dispersion is 0.008 parts by weight.

Example 22

A conductive polymer microparticle dispersion is prepared in the same manner as in Example 1 except for using, as the first oxidizing agent, 8.5 parts by weight of ferric chloride in place of the ferric sulfate, and as the second oxidizing agent, 30 parts by weight of sodium persulfate in place of the ammonium persulfate. The concentration of the trivalent iron ions with respect to 100 parts by weight of the poly3,4-ethylenedioxythiophene doped with the polystyrene sulfonic acid at the completion of the polymerization is 3.0 parts by weight. The content of the trivalent iron ions with respect to 100 parts by weight of the dispersion is 0.007 parts by weight.

The following is a description of Comparative Examples.

Comparative Examples 1-3

Comparative Example 1 uses the following materials in the following contents: 14.2 parts by weight of the 3,4-ethylenedioxythiophene; 30.5 parts by weight of the polystyrene sulfonic acid; 7.0 parts by weight of the ferric sulfate; 29.8 parts by weight of the ammonium persulfate; and 4887 parts by weight of the distilled water. In Comparative Example 2, the ferric sulfate content is 3.5 parts by weight, the distilled water content is 320 parts by weight, and contents of other materials are the same as Comparative Example 1. In Comparative Example 3, the ferric sulfate content is 2.3 parts by weight, the distilled water content is 104 parts by weight, and contents of other materials are the same as Comparative Example 1. Conductive polymer microparticle dispersions of Comparative Examples 1 to 3 are prepared in the same manner as in Example 1 except for the above-mentioned conditions.

The content (concentration) of the trivalent iron ions with respect to 100 parts by weight of the poly3,4-ethylenedioxythiophene doped with the polystyrene sulfonic acid at the completion of the polymerization is as follows: 2.7 parts by weight in Comparative Example 1; and 2.8 parts by weight in Comparative Examples 2 and 3.

The content of the trivalent iron ions with respect to 100 parts by weight of the dispersion is as follows: 0.008 parts by weight in Comparative Example 1; 0.112 parts by weight in Comparative Example 2; and 0.220 parts by weight in Comparative Example 3.

Comparative Examples 4-6

In Comparative Examples 4, 5, and 6, conductive polymer microparticle dispersions are prepared in the same manner as in Example 1 except for changing the contents of the materials. Comparative Example 4 uses the following materials in the following contents: 14.2 parts by weight of the 3,4-ethylenedioxythiophene; 30.5 parts by weight of the polystyrene sulfonic acid; 78.7 parts by weight of the ferric sulfate; 29.8 parts by weight of the ammonium persulfate; and 56703 parts by weight of the distilled water. In Comparative Example 5, the ferric sulfate content is 39.5 parts by weight, the distilled water content is 4443 parts by weight, and contents of other materials are the same as Comparative Example 4. In Comparative Example 6, the ferric sulfate content is 30.0 parts by weight, the distilled water content is 1964 parts by weight, and contents of other materials are the same as Comparative Example 1.

The content (concentration) of the trivalent iron ions with respect to 100 parts by weight of the poly3,4-ethylenedioxythiophene doped with the polystyrene sulfonic acid at the completion of the polymerization is as follows: 30.6 parts by weight in Comparative Example 4; 32.0 parts by weight in Comparative Example 5; and 32.2 parts by weight in Comparative Example 6.

The content of the trivalent iron ions with respect to 100 parts by weight of the dispersion is as follows: 0.007 parts by weight in Comparative Example 4; 0.100 parts by weight in Comparative Example 5; and 0.220 parts by weight in Comparative Example 6.

The conductive polymer microparticle dispersions prepared in Examples and Comparative Examples each contain the poly3,4-ethylenedioxythiophene doped with the polystyrene sulfonic acid. These conductive polymer microparticle dispersions thus obtained are washed and filtered with distilled water, and then the concentration of the poly3,4-ethylenedioxythiophene is adjusted to 2.5%. Next, each capacitor element 10 is impregnated with the corresponding dispersion to form solid electrolyte layer 5, thereby preparing a wound electrolytic capacitor having a rated voltage of 35 V and a capacitance of 47 μF.

Table 1 shows the yield of the poly3,4-ethylenedioxythiophene doped with the polystyrene sulfonic acid in each of the Examples and the Comparative Examples, and the ESR values of the electrolytic capacitors manufacture by using the dispersions.

TABLE 1

| | Content of trivalent iron ions with respect to 100 parts by weight of the PEDOT (parts by weight) | Content of trivalent iron ions with respect to 100 parts by weight of the dispersion (parts by weight) | ESR of the electrolytic capacitor (mΩ) | Yield of PEDOT doped with PSS (%) |
|---|---|---|---|---|
| Example 1 | 3.0 | 0.007 | 34.2 | 88.8 |
| Example 2 | 3.1 | 0.01 | 31.8 | 91.0 |
| Example 3 | 3.0 | 0.111 | 32.0 | 89.9 |
| Example 4 | 3.1 | 0.19 | 31.6 | 91.1 |
| Example 5 | 3.0 | 0.233 | 34.1 | 90.1 |
| Example 6 | 9.4 | 0.008 | 33.9 | 90.7 |
| Example 7 | 10.2 | 0.010 | 30.9 | 89.8 |
| Example 8 | 10.1 | 0.105 | 30.8 | 90.2 |
| Example 9 | 10.0 | 0.200 | 31.2 | 91.8 |
| Example 10 | 10.5 | 0.224 | 33.8 | 92.0 |
| Example 11 | 30.0 | 0.007 | 33.8 | 90.3 |
| Example 12 | 29.8 | 0.010 | 32.2 | 90.1 |
| Example 13 | 29.6 | 0.110 | 31.0 | 92.0 |
| Example 14 | 29.8 | 0.198 | 32.9 | 91.8 |
| Example 15 | 30.0 | 0.225 | 33.3 | 92.0 |
| Example 16 | 10.3 | 0.113 | 30.0 | 90.2 |
| Example 17 | 10.3 | 0.101 | 28.1 | 91.8 |
| Example 18 | 10.5 | 0.110 | 27.5 | 90.7 |
| Example 19 | 10.1 | 0.100 | 29.4 | 90.5 |
| Example 20 | 3.1 | 0.008 | 34.7 | 92.0 |
| Example 21 | 3.0 | 0.008 | 34.5 | 90.2 |
| Example 22 | 3.0 | 0.007 | 34.9 | 91.8 |
| Comparative Example 1 | 2.7 | 0.008 | 38.2 | 45.2 |
| Comparative Example 2 | 2.8 | 0.112 | 35.6 | 44.8 |
| Comparative Example 3 | 2.8 | 0.220 | 36.8 | 45.0 |
| Comparative Example 4 | 30.6 | 0.007 | 77.7 | 91.1 |
| Comparative Example 5 | 32.0 | 0.100 | 68.9 | 90.8 |
| Comparative Example 6 | 32.2 | 0.220 | 90.5 | 91.0 |

PEDOT: poly3,4-ethylenedioxythiophene
PSS: polystyrene sulfonic acid

In Examples 1-22, the content of the trivalent iron ions with respect to 100 parts by weight of the poly3,4-ethylenedioxythiophene contained in the dispersion at the completion of the polymerization is 3 to 30 parts by weight, inclusive. The yield of each poly3,4-ethylenedioxythiophene is approximately 90%. The ESRs of electrolytic capacitors manufactured by using these conductive polymer microparticle dispersions fall within the target range, 35 mΩ or less.

In Examples 2-4, 7-9, and 12-14, the content of the trivalent iron ions with respect to 100 parts by weight of the poly3,4-ethylenedioxythiophene dispersion is 0.01 to 0.20 parts by weight, inclusive. In these examples, the ESRs of the electrolytic capacitors are lower than those in Examples 1, 5, 6, 10, 11, and 15. Thus, it is preferable that the concentration of the trivalent iron ions in the conductive polythiophene dispersion doped with the polyanion be 0.01 to 0.20 parts by weight, inclusive, with respect to 100 parts by weight of the polythiophene dispersion. This further reduces the ESRs of the electrolytic capacitors.

The electrolytic capacitors in Example 16-18, in which the oxidizing agents are added to the dispersion liquid in a plurality of batches separately, have lower ESRs than in the other examples. In other words, the ESRs of the electrolytic capacitors in Example 16-18 are lower than in Example 8 which is prepared from the same materials in the same contents as Example 16-18.

In Example 8, the oxidizing agents are added in one batch. This causes the polymerization to proceed quickly, thereby generating a comparatively large number of short-chain polymers. In Example 16-18, on the other hand, the oxidizing agents are added in batches separately. This allows the polymerization to proceed slowly, generating a smaller number of short-chain polymers than in the case of one batch addition. This seems to be the reason why the resistance component due to the resistance between polymer chains is reduced and hence the ESR is reduced. Therefore, the oxidizing agents are preferably added to the dispersion liquid in a plurality of batches separately so as to further reduce the ESRs of the electrolytic capacitors.

A comparison between Examples 16-18 indicates that the ESR of the electrolytic capacitor is lower in Examples 17 and 18, in which the oxidizing agents are added to the dispersion liquid in two batches separately, than in Example 16. Therefore, it is preferable to add the oxidizing agents in two batches separately so as to further reduce the ESR of the electrolytic capacitor.

The ESR of the electrolytic capacitor in Example 18, in which the interval between the first and second additions of the oxidizing agents is 30 minutes, is lower than in Examples 16 and 17. Although not shown, it is confirmed that the ESR of the electrolytic capacitor is not reduced very much when the interval between the first and second additions of the oxidizing agents is made longer than 30 minutes. Consequently, the interval between the two additions of the oxidizing agents can be made 30 minutes or more to further reduce the ESR of the electrolytic capacitor.

In Example 19, ammonium persulfate as the second oxidizing agent is added first and then ferric sulfate is added as the first oxidizing agent. The ESR of the electrolytic capacitor is lower in Example 19 than in Example 8.

As described above, the first oxidizing agent containing ferric sulfate has a high oxidizability, causing the polymerization to proceed quickly, thereby generating a comparatively large number of short-chain polymers. The second oxidizing agent containing ammonium persulfate, on the other hand, has a comparatively moderate oxidizability. Adding the ammonium persulfate first prevents quick polymerization in the initial period, allowing slow polymerization. This seems to be the reason why the number of the short-chain polymers reduces and hence the ESR of the electrolytic capacitor reduces. However, using ammonium persulfate alone as the oxidizing agent greatly decreases the speed of the polymerization, also making it likely to generate short-chain polymers. Therefore, it is preferable to use the first and second oxidizing agents together than to use either of them alone. It is further preferable to add the second oxidizing agent first and then to add the first oxidizing agent. This further reduces the ESR of the electrolytic capacitor.

The oxidizing agents used in Example 1 are a combination of ferric sulfate for making the polymerization proceed quickly and ammonium persulfate for making it proceed slowly compared with ferric sulfate. In Examples 20-22, on the other hand, at least one of ferric sulfate and ammonium persulfate used in Example 1 is replaced by the same amount of another oxidizing agent with a different polymerization rate. As a result, the ESR of each of the electrolytic capacitor is slightly higher in Examples 20-22 than in Example 1. For some reason, which is not clear, it seems that the rate of polymerization in Example 1 provides the length of polymer chains best suited for a solid electrolyte for an electrolytic capacitor. Thus, it is preferable that the oxidizing agent contains at least ferric sulfate as the first oxidizing agent and ammonium persulfate as the second oxidizing agent used together with the first oxidizing agent. Using such oxidizing agents can further reduce the ESR of the electrolytic capacitor.

In Comparative Examples 1-3, on the other hand, the content of the trivalent iron ions with respect to 100 parts by weight of the poly3,4-ethylenedioxythiophene is less than 3 parts by weight. The ESRs of the electrolytic capacitors in Comparative Examples 1-3 are not low enough to be at 35 m$\Omega$ or less. Moreover, the yield of the poly3,4-ethylenedioxythiophene doped with the polystyrene sulfonic acid is as low as 50% or less.

In Comparative Examples 4-6, the content of the trivalent iron ions with respect to 100 parts by weight of the poly3,4-ethylenedioxythiophene exceeds 30 parts by weight. The yield of the poly3,4-ethylenedioxythiophene doped with the polystyrene sulfonic acid is 90% or higher; however, the ESR of the electrolytic capacitor is far higher than 35 m$\Omega$.

The exemplary embodiment has described a wound solid electrolytic capacitor containing aluminum foils as electrodes, but the present disclosure is not limited to this configuration. The conductive polymer microparticle dispersions manufactured according to the method of the present exemplary embodiment can be applied, for example, to the following capacitors: a wound solid type including electrodes made of valve metal foils other than aluminum; a stacked type; a type including a positive electrode body made of a sintered valve metal; and a hybrid type containing both a solid electrolyte and an electrolytic solution.

The materials, manufacturing methods, and evaluation techniques described in Examples 1 to 22 are mere examples and do not limit the present disclosure thereto.

The present disclosure is useful for an electrolytic capacitor including a conductive polymer microparticle dispersion.

What is claimed is:

1. A method of manufacturing a conductive polymer microparticle dispersion, the method comprising:
    preparing a dispersion liquid including one of thiophene and derivatives thereof, a polyanion, and a solvent; and
    forming a conductive polymer microparticle dispersion containing conductive polymer microparticles by mixing the dispersion liquid with a first liquid solution containing a first oxidizing agent and a second liquid solution containing a second oxidizing agent so as to oxidatively polymerize the one of thiophene and derivatives thereof, wherein:
    the first oxidizing agent produces trivalent iron ions in the dispersion liquid and the second oxidizing agent does not produce trivalent iron ions in the dispersion liquid, and
    at completion of the oxidative polymerization, the conductive polymer microparticle dispersion contains trivalent iron ions with a concentration of 3 to 30 parts by weight, inclusive, with respect to 100 parts by weight of the conductive polymer microparticles.

2. The method according to claim 1, wherein the concentration of the trivalent iron ions contained in the conductive polymer microparticle dispersion is 0.01 to 0.20 parts by weight, inclusive, with respect to 100 parts by weight of the conductive polymer microparticle dispersion.

3. The method according to claim 1, wherein the first oxidizing agent includes iron (III) sulfate, and the second oxidizing agent includes ammonium persulfate.

4. The method according to claim 1, wherein one of the first liquid solution and the second liquid solution is added into the dispersion liquid after the other of the first liquid solution and the second liquid solution is added into the dispersion liquid.

5. The method according to claim 1, wherein the first liquid solution is divided into a plurality of batches and the plurality of batches are mixed with the dispersion liquid separately.

6. The method according to claim 5, wherein an interval between first mixing of one of the two batches of the first liquid solution and second mixing of another of the two batches of the first liquid solution with the dispersion liquid is not less than 30 minutes.

7. The method according to claim 1, further comprising filtering the conductive polymer microparticle dispersion after forming the conductive polymer microparticle dispersion.

8. A method of manufacturing a conductive polymer microparticle dispersion, the method comprising:
    preparing a dispersion liquid including one of thiophene and derivatives thereof, a polyanion, and a solvent; and
    forming a conductive polymer microparticle dispersion containing conductive polymer microparticles by mixing the dispersion liquid with a first oxidizing agent and a second oxidizing agent so as to oxidatively polymerize the one of thiophene and derivatives thereof, wherein:

the first oxidizing agent produces trivalent iron ions in the dispersion liquid and the second oxidizing agent does not produce trivalent iron ions in the dispersion liquid, one of the first oxidizing agent and the second oxidizing agent is added into the dispersion liquid after the other of the first oxidizing agent and the second oxidizing agent is added into the dispersion liquid, and at completion of the oxidative polymerization, a concentration of the trivalent iron ions in the solvent is 3 to 30 parts by weight, inclusive, with respect to 100 parts by weight of conductive polymer microparticles.

9. The method according to claim 8, wherein the second oxidizing agent is divided into a plurality of batches and the plurality of batches are mixed with the dispersion liquid separately.

10. The method according to claim 8, further comprising filtering the conductive polymer microparticle dispersion after forming the conductive polymer microparticle dispersion.

11. A method of manufacturing a conductive polymer microparticle dispersion, the method comprising:

preparing a dispersion liquid including one of thiophene and derivatives thereof, a polyanion, and a solvent; and forming a conductive polymer microparticle dispersion containing conductive polymer microparticles by mixing the dispersion liquid with a first liquid solution containing a first oxidizing agent and a second liquid solution containing a second oxidizing agent so as to oxidatively polymerize the one of thiophene and derivatives thereof, wherein:

the first oxidizing agent produces trivalent iron ions in the dispersion liquid and the second oxidizing agent does not produce trivalent iron ions in the dispersion liquid, and one of the first liquid solution and the second liquid solution is added into the dispersion liquid after the other of the first liquid solution and the second liquid solution is added into the dispersion liquid.

12. The method according to claim 11, wherein the first oxidizing agent includes iron (III) sulfate, and the second oxidizing agent includes ammonium persulfate.

13. The method according to claim 4, wherein after the second liquid solution is added into the dispersion liquid, the first liquid solution is added into the dispersion liquid.

14. The method according to claim 2, wherein one of the first liquid solution and the second liquid solution is added into the dispersion liquid after the other of the first liquid solution and the second liquid solution is added into the dispersion liquid.

15. The method according to claim 2, wherein the first oxidizing agent includes iron (III) sulfate, and the second oxidizing agent includes ammonium persulfate.

16. The method according to claim 4, wherein the first oxidizing agent includes iron (III) sulfate, and the second oxidizing agent includes ammonium persulfate.

17. The method according to claim 14, wherein the first oxidizing agent includes iron (III) sulfate, and the second oxidizing agent includes ammonium persulfate.

18. The method according to claim 8, wherein the concentration of the trivalent iron ions contained in the conductive polymer microparticle dispersion is 0.01 to 0.20 parts by weight, inclusive, with respect to 100 parts by weight of the conductive polymer microparticle dispersion.

19. The method according to claim 8, wherein the first oxidizing agent includes iron (III) sulfate, and the second oxidizing agent includes ammonium persulfate.

20. The method according to claim 18, wherein the first oxidizing agent includes iron (III) sulfate, and the second oxidizing agent includes ammonium persulfate.

* * * * *